United States Patent [19]
Johnson

[11] 3,955,441
[45] May 11, 1976

[54] PUSH-PULL CABLE MOUNTING ASSEMBLY

[75] Inventor: Donald L. Johnson, Kenosha, Wis.

[73] Assignee: J. I. Case Company, Racine, Wis.

[22] Filed: Dec. 20, 1974

[21] Appl. No.: 534,902

[52] U.S. Cl. .............................. 74/501 R; 403/316; 74/501 P
[51] Int. Cl.² ........................................... F16C 1/10
[58] Field of Search ...................... 74/501 R, 501 P; 403/316, 317, 347, 353

[56] References Cited
UNITED STATES PATENTS
3,032,375  5/1962  Lalandre ....................... 403/316 X Primary Examiner—Benjamin W. Wyche
Assistant Examiner—Frank H. McKenzie, Jr.
Attorney, Agent, or Firm—Arthur J. Hansmann

[57] ABSTRACT

A push-pull cable mounting assembly including a mounting member having a hole and an opening contiguous to the hole. A cable is disposed in the hole and is insertable therein by moving it through the opening which is larger than the hole itself. The cable has spaced-apart shoulders which engage opposite sides of the mounting member and thereby longitudinally restrict the movement of the cable casing. A plug is disposed in the opening adjacent the hole and thereby prevents the cable from moving out of the hole.

3 Claims, 8 Drawing Figures

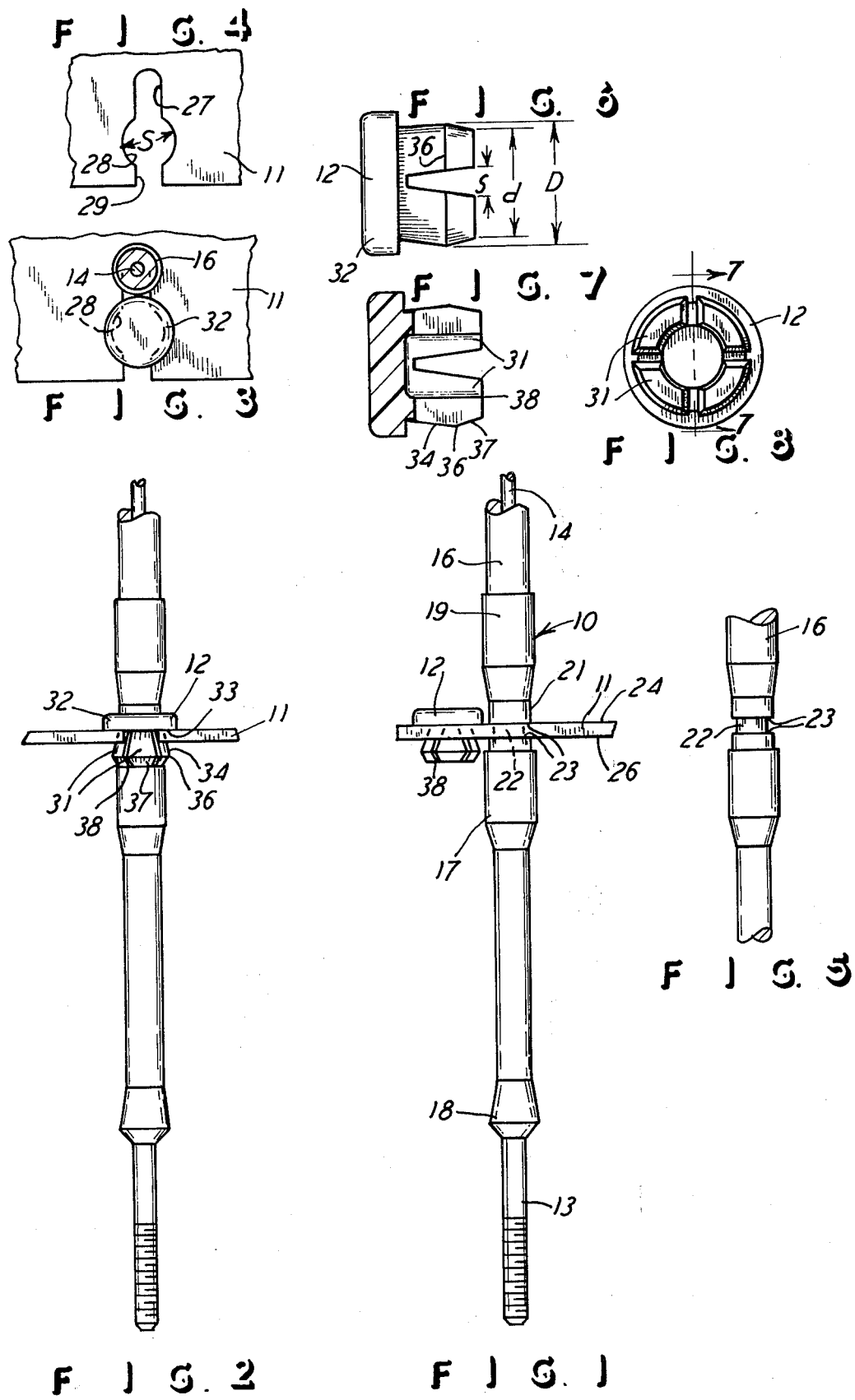

3,955,441

PUSH-PULL CABLE MOUNTING ASSEMBLY

This invention relates to a push-pull cable mounting assembly, and, more particularly, it relates to the arrangement of a push-pull cable in an installation wherein no threaded retainers, machined fasteners, pivotaly mounted arms, or any other movable and expensive part is required for removably securing the cable in a position on a mounting member.

BACKGROUND OF THE INVENTION

With regard to the installation and the provision of push-pull cables useful in controlling a variety of items such as remotely located devices including those commonly found on tractors and like industrial vehicles and machines, the prior art is already aware of different push-pull cable mounting assemblies. However, the prior art assemblies commonly require threaded parts, such as nuts and engaging pieces and other fasteners for securing the cable to a mounting member. Alternatively, the prior art is also aware of the use of clips and movable pivoted members, and other expensive arrangements for securing a controlled cable to a mounting member. Accordingly, it is an object of this invention to provide an easily constructed and assembled arrangement of a push-pull cable mounting assembly, and one which is generally an improvement over those already known in the art.

Further, it is an object of this invention to provide a push-pull cable assembly which consists of relatively inexpensive and easily provided parts, and wherein the parts can be readily and easily assembled and disassembled, for the respective functions implied, and wherein the assembly of this invention does not require and threaded parts nor does it require any moving parts which must be attached in unity with other parts, such as pivotal clips and the like.

Still further, it is an object of this invention to generally accomplish the aforementioned objectives and to also provide a construction wherein the cable can be manipulated or positioned for attaching to the device that it is to control, and yet have the cable completely maneuverable for the purpose mentioned and to ultimately have it positioned in a releasably secure position by means of readily attached but inexpensive and reliable parts.

Other objects and advantages will become apparent upon reading the following description in light of the accompanying drawing.

BRIEF DESCRIPTION OF THE DRAWING

FIG. 1 is a side elevational view of the assembly of this invention.

FIG. 2 is an end elevational view of FIG. 1.

FIG. 3 is a top plan view of FIG. 2.

FIG. 4 is a top plan view of only the mounting member shown in FIG. 3.

FIG. 5 is a side elevational view of a fragment of the cable shown in FIG. 1.

FIG. 6 is an enlarged side elevational view of the plug shown in FIG. 1.

FIG. 7 is a sectional view of the plug of FIG. 6, and with the view being taken along the line 7—7 of FIG. 8 which shows the plug.

FIG. 8 is an end elevational view of the plug shown in FIGS. 6 and 7.

DETAILED DESCRIPTION OF THE PREFERRED EMBODIMENT

FIGS. 1, 2 and 3 show the assembly to generally include the push-pull cable 10, and the mounting member or bracket 11, and the retainer plug 12. It will be understood by one skilled in the art that the cable 10 is useful in providing a remote control for devices attached to the one end of the cable, such as the axially movable end 13, and an interiorly supported and axially movable cable wire 14 extends through the casing 16 of the cable 10, and such arrangement may be in a usual and well-known construction. The casing 16 has enlarged portions 17, 18, and 19, as shown, and as compared to the portion 21 which is of a span or diameter or thickness less than that of the aforementioned three cable portions. Still further, the casing 16 has a reduced portion 22 which is of a span or thickness or diameter less than that of any of the aforementioned cable portions. The reduced portion 22 is defined by and flanked by shoulders 23 on the casing 16, and the shoulders 23 abut the respective upper and lower surfaces 24 and 26 of the mounting member 11. Thus, the cable 10 is an elongated member and is fixed along its length relative to the mounting member 11 and thus the casing 16 cannot axially or along its length, and only the interior control member 14 of the cable 10 is axially movable, all in the conventional arrangement.

Therefore, the cable casing 16 extends through a hole 27 in the mounting member 11, and the span or width of the hole 27 is only slightly larger than the span or diameter of the cable casing reduced portion 22 but is less than the outer or overall span dimension of the cable shoulders 23. Therefore, the cable reduced portion 22 is received in the opening 27, and the cable shoulders 23 abut the member 11, as mentioned, and thus the cable 10 is axially fixed relative to the member 11.

The member 11 also has an opening 28 which is contiguous with the hole 27, to form the keyhole arrangement as seen in FIG. 4, and thus the hole 27 and opening 28 form one continuous opening therebetween such that the cable 10 can be passed axially through the opening 28 to a position where the cable-reduced portion 22 is in line with the hole 27, and then the cable can be moved laterally to position the cable in the hole 27 in the position shown in FIGS. 1 and 2 and 3. The hole 27 is thus actually a slot having a width which is less than the maximum span of the cable shoulders 23, for securing the cable 10 with the member 11, as shown and described. Finally, the member 11 may be provided with an end opening 29, and the opening 29 is of a width at least as great as the width of the hole 27, and thus the cable 10 could be assembled with the member 11 by moving the cable 10 laterally through the opening 29 when the cable portion 22 is disposed in the opening 29 and is then further moved into the hole 27 to the assembled position shown. However, the opening 29 is not fully necessary, particularly in situations where the cable 10 can be moved longitudinally or axially of itself and through the opening 28 to position the cable portion 22 in the hole 27.

The plug 12 is disposed in the opening 28 and includes four legs 31 and a head 32. The plug is made of a slightly flexible material, such as a plastic which permits the legs 31 to flex from the spaced-apart leg positions of FIG. 6 to the closed leg positions of FIGS. 1 and 2. That is, the plug 12 is in the nature of a button which can be pressed axially of the plug and axially of the circularly shaped opening 28 to thereby seat the plug 12 in the position shown in FIGS. 1 and 2 and 3. The plug 12 thus prevents the cable 10 from moving out of the hole 27, and thereby the assembly is achieved without the need for any threaded or other expensive and complicated parts. Further, the plug 12 can be readily removed from the opening 28, and then the cable 10 can be removed from its assembled position, and the entire assembly can also be repositioned, and the parts are all conducive to the assembly and disassembly a plurality of times.

The head 32 is shown to be circular in a top view thereof, and thus the overall span or diameter of the head 32 is greater than the overall span or diameter of the opening 28, and the head lower surface 33 abuts the member upper surface 24 in the seated position of the plug as shown. Further, the plug legs 31 diverge outwardly from each other and have projecting or outwardly directed surfaces 34 which are an overall dimension slightly greater than the overall diameter or dimension of the opening 28. That is, the outer surfaces 34 of the plug legs 31 are formed by two inverted cone shapes which converge at the outermost edge designated 36, and the edge 36 has an overall span greater than the overall diameter or span of the opening 28. Further, the lower portion 37 of the plug legs 31 presents a lead-in surface for pressing the plug 12 into the opening 28, and thus the span or diameter of the lower edge 38 of the plug 12, as seen in FIGS. 1 and 2, is of a diameter less than the diameter or overall span of the opening 28 even when the plug legs 31 are in their spaced-apart or free-body position.

The entire arrangement with respect to the plug 12 is such that the plug is of a slightly flexible matrial, such as a plastic material, and the legs 31 are normally spaced apart in their unrestricted or free-body position, and the plug lower surfaces 37 provide a lead-in for pressing the plug into the opening 28. The legs 31 flex inwardly for further moving into the opening 28, and the leg edge 36 will then move radially outwardly, as the legs somewhat spread apart and move away from each other after passing down into the opening 28, and thus the plug 12 is physically restricted in the opening 28 by means of the plug head surface 31 abutting the member upper surface 24 and the plug diverging surfaces 34 being in interference fit with the lower edge of the opening 28 as defined by the surface 26 of the member 11. Of course the plug 12 can be pressed from or pried out of the opening 28 for disassembling the arrangement shown. FIGS. 6, 7 and 8 show the configuration of the plug 12, and it will of course be understood that the plug 12 is constructed, disposed, dimensioned, and of a character sufficient to be secure in the opening 28 and thereby prevent removal of the cable 10 from the hole 27. That is, the plug head 32 extends to contact with or very close to the side of the cable 10, as seen in FIGS. 1 and 3, and thus the cable 10 cannot move out of the hole 27 without removal of the plug 12 from the opening 28. Further, the plug legs 31 in the plane of the member 11 in the assembled position may be snug with the opening 28 to thereby firmly secure the plug 12 in the opening 28, and, also, the overall span or dimension of the plug legs 31 at that plane of the member 11 is greater than the dimension of the opening 29, to thereby preclude the plug 12 from sliding out the opening 29. Thus, the plug dimension designated $d$ in FIG. 6 is that dimension across the plug lower edge 38 and that dimension is less than the span or diameter designated "S" of the opening 28 as seen in FIG. 4, and therefore the plug 12 has a lead in for being pressed into the opening 28. Still further, the plug dimension D in FIG. 6 is the dimension across the edge 36 of the plug, and that dimension is greater than the opening span S and thus the plug is secure in the opening 28 in the assembled position. Still further, the plug legs 31 are spaced apart the distance $s$ shown in FIG. 6 so that the legs can flex inwardly and thereby reduce the dimension D to a size less than that of the span S for removal of the plug 12, and therefore the plug is thus dimensioned and flexible within the characteristics disclosed herein. Therefore, the plug legs 31 present a shank portion which passes through and into the opening 28, and the plug head 32 is of a size larger than the opening 28 and thereby overlaps the opening 28, as shown. The legs 31 are therefore in interference in the opening 28 and relative to the member 11, by virtue of the dimensions and the flexibility described and being required in order to accomplish that which is mentioned herein and which is shown in the drawings. The plug legs 31 therefore diverge outwardly on their outer surfaces and from the point at the juncture with the plug head 32 and to the location of the corner 36 which has the overall span and dimension D, all as seen in FIGS. 6 and 7.

What is claimed is:

1. A push-pull cable mounting assembly, comprising a mounting member having a hole extending therethrough, an elongated push-pull cable including an elongated casing having spaced-apart shoulders and a reduced thickness portion between said shoulders and with said portion being snugly disposed in said hole, said shoulders being of an over-all dimension greater than that of said hole and spanning said hole, and said shoulders being disposed to be in opposed abutment with said mounting member to thereby restrict movement of said casing along the length of said casing, said mounting member having an opening contiguous with said hole for movement of said cable through said opening and into the aforesaid position of said cable in said hole in assembling said cable with said mounting member, and a plug separate from said cable being in the nature of a button having a shank portion disposed in said opening and having a head portion of a size larger than the spand of said opening for overlapping said opening and abutting said mounting member, and said plug being free of said cable to be movable separately from the position of said cable and thereby be positionable relative to and independent of said cable, said plug being of a resilient material, such as a plastic, and said shank portion including legs which are spaced apart in the free-body and unassembled position of said plug to have an over-all span slightly greater than the span of said opening, and said legs being flexible and thereby displaceable toward and away from each other for securely snapping into said opening upon movement of said plug into said opening along the axis of said opening.

2. The push-pull cable mounting assembly as claimed in claim 1, wherein said legs include projecting surfaces extending away from each other at the maximum span of said legs, for interference fit of said plug with said mounting member when said plug is in said opening.

3. The push-pull cable mounting assembly as claimed in claim 1, wherein said cable casing has a large portion of a cross-sectional thickness greater than the size of said hole but less than the size of said opening, for movement of said casing into said opening and to its seated position in said hole, and said plug having a head portion of a span greater than the span of said opening for overlapping said opening and thereby abutting said mounting member.

* * * * *